INVENTOR.
Thomas Gross
BY
Brown and Mikulka
and
Leonard S. Selman
ATTORNEYS

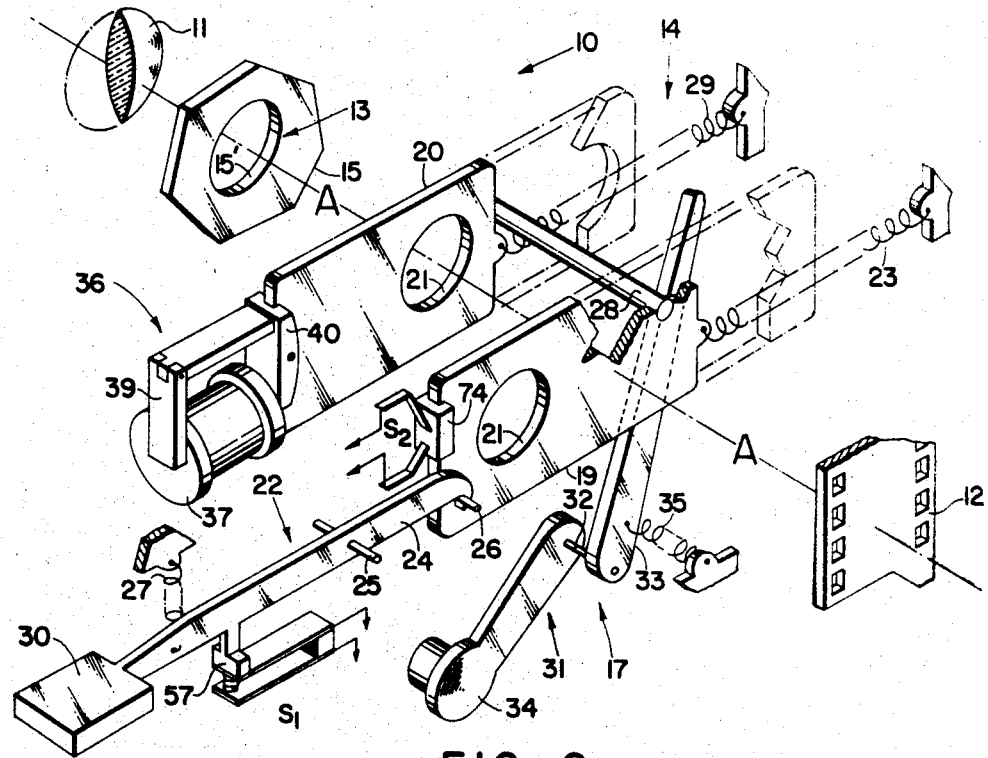
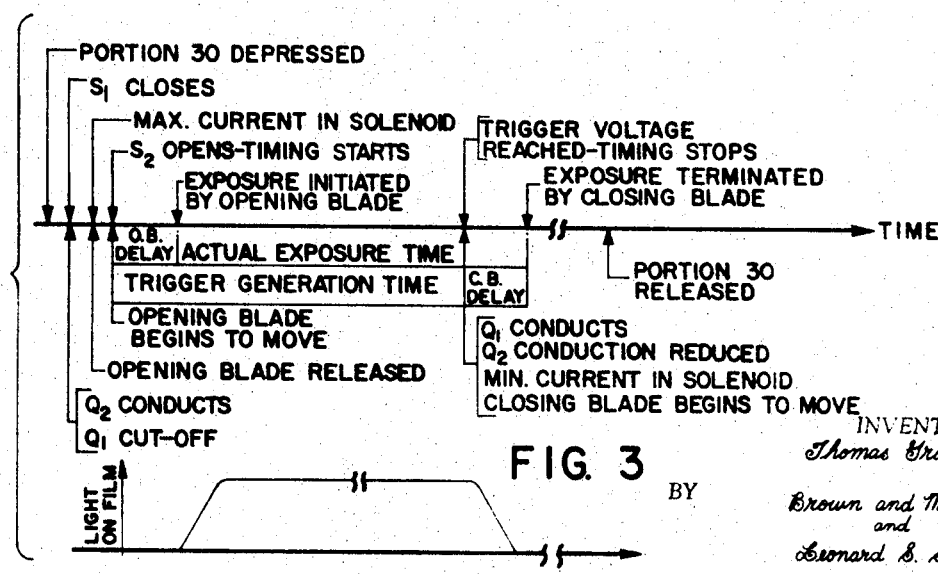

United States Patent Office 3,473,453
Patented Oct. 21, 1969

3,473,453
EXPOSURE CONTROL MEANS
Thomas Gross, Lincoln, Mass., assignor to Polaroid Corporation, Cambridge, Mass., a corporation of Delaware
Filed Jan. 5, 1967, Ser. No. 607,476
Int. Cl. G01j 1/00, 1/52; G03b 27/78
U.S. Cl. 95—10                                    7 Claims

ABSTRACT OF THE DISCLOSURE

This application relates to a photographic camera and it discloses exposure control means for photographing scenes that can have different levels of brightness in various portions of the picture area such that the correct exposure is functionally related to the various levels of brightness in each portion.

BACKGROUND OF THE INVENTION

In recent years it has become a common practice to incorporate a photoresponsive means into a camera body to automatically or semi-automatically control the diaphragm or shutter means of a camera to provide the proper exposure factor for the particular scene to be photographed.

These control means have been primarily designed to give proper exposure under the ordinary light conditions encountered by amateur photographers. They commonly employ means such as photocells responsive to the light directed from the entire scene to be photographed obtaining what may be termed an average reading over the picture area and the diaphragm and shutter means are set accordingly. While for most situations this type of control means results in an acceptable photograph there are certain situations such as those in which the light source is behind the subject (referred to as backlighting) or where there is great contrast between two unequally important areas of a scene (such as a bright sky and a dark subject in the foreground) where the results obtained by such overall readings of the entire scene are unsatisfactory.

A partial solution to this problem is to take separate readings of the various portions of the scene with a separate exposure meter or a so-called spotmeter and then to derive an exposure factor from the readings, giving emphasis to the readings from the more important picture areas. This procedure, however, is too complicated for use by most amateur photographers and thus the present invention has been directed to providing an exposure control means in a photographic camera, which automatically relates the exposure to the brightness of the various portions of the scene.

SUMMARY OF THE INVENTION

This invention provides exposure control means in a photographic camera which gives optimum automatic exposure control even in a typical picture taking situations.

In a preferred embodiment a plurality of photoconductors receive light from substantially separate portions of the scene to be photographed, and the individual photoconductors are connected in a unique manner in an electrical control circuit such that a balanced exposure is achieved in a completely automatic manner.

Accordingly, it is an object of this invention to provide improved automatic control of exposure in a photographic camera.

It is another object of this invention to provide automatic exposure control means responsive to the light from various portions of the scene to be photographed.

It is a further object of this invention to improve the performance of an automatic exposure control means in a photographic camera by preventing the dominating effects on photoconductive means incorporated within the camera of less important brightly lighted portions of a scene to be photographed.

The invention accordingly comprises the apparatus possessing the construction, combination of elements and arrangements of parts which are exemplified in the following detailed disclosure, and the scope of the application of which will be indicated in the claims.

BRIEF DESCRIPTION OF THE DRAWINGS

FIG. 2 is a schematic representation of a camera of a type particularly well adapted for use with the present invention; and FIG. 3 is an expanded time-scale diagram for the purpose of illustrating the chronology of events associated with effecting exposure utilizing the camera of FIG. 2 and the electrical system of FIGURE 1.

DESCRIPTION OF THE PREFERRED EMBODIMENT

Figure 1:
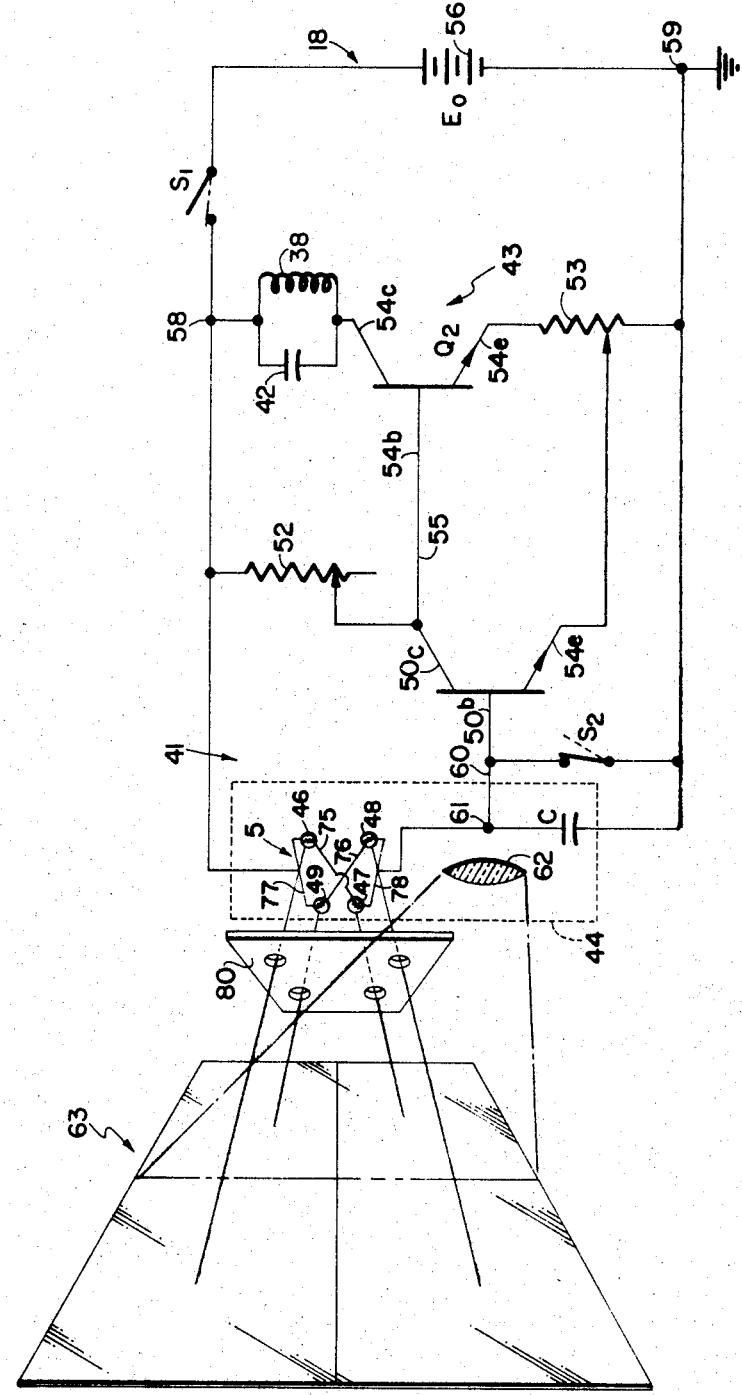
FIGURE 1 is a schematic electrical diagram of the present invention including a representation of the photoresponsive elements incorporated into the camera receiving light from substantially separate portions of the scene to be photographed.

The exposure control system which is the subject matter of the present invention may control either the exposure interval or the size of the diaphragm opening, or both, to achieve the proper exposure factor for a particular scene to be photographed.

Referring to FIGURE 1, the electrical network 5 includes four photosensitive elements schematically shown as receiving light from four substantially separate portions of the scene being photographed. Each of these elements has an electrical parameter which varies in accordance with the quantity of light incident thereon from its respectively associated portion of the scene. The pairs of photosensitive elements receiving light from the diagonally opposite portions of the rectangular picture area are connected in series and the diagonal pairs are connected in parallel across the terminals of network 5 so that a fully balanced reading of the scene brightness may be obtained. A more detailed description with a specific example of exactly how this is accomplished appears later in this description. The electrical circuitry shown in FIG. 1 is designed to be responsive to the electrical current flow through the network 5 and to control accordingly the exposure interval or the size of the diaphragm opening, or both, depending upon the brightness of the various portions of the scene. The diagonal sensing of the various portions of the picture area has been found to be especially advantageous in producing a well balanced exposure. The diagonal portions of the picture area usually complement each other, as for example in the case of a bright sky and darker foreground; or a subject sitting near a bright window on one side of the picture area. The series connections between the photoconductors positioned to receive light from the diagonally opposite portions of the scene are important features of the exposure control means of the invention and result in an exposure factor which gives greater effect to the darker areas of the scene than the lighter areas and the positive effect is to bring out the detail in the darker areas in the final picture obtained. Whereas small areas of brightness which may appear both in the top and bottom half of a scene being photographed may result in an overexposure in a system which, for example, senses the top and bottom portions of the scene, this is less likely where diagonally opposite portions of the scene are sensed simultaneously, as in the present invention, with the combined response of the sensing means controlling the exposure.

In the preferred embodiment of the invention, the exposure is regulated by means of shutter control means to be described. The shutter control means is shown in the drawing as embodied into a camera having a particular type of mechanical shutter, but the latter is for the purpose of illustrating the invention in a representative environment, it being understood that other types of shutter means could also be used with the shutter control means disclosed in order to derive the new and improved results attendant thereto.

The term "photoconductor" as used in the specification and claims should be understood to include any photosensitive element having a conductive parameter which varies in accordance with the light incident thereon, such as photodiodes and phototransistors.

Referring now to FIG. 2, camera 10 is shown schematically as including lens 11 for receiving light from a scene being photographed, and focusing it through an aperture in diaphragm means 13 onto film 12 to effect exposure of the latter by the proper operation of shutter mechanism 14 which is interposed in the optical path of the light.

Diaphragm 13 may take the form of a disc 15 mounted on the camera housing. Disc 15 contains exposure aperture 15' of preselected area aligned with the optical axis A—A of the camera.

Shutter mechanism 14 may include shutter means 17, and shutter control means 18 as shown in FIGURE 1. Shutter means 17 may take the form of a pair of planar, opaque blades 19 and 20 each provided with an exposure orifice 21, and mounted in tracks (not shown) so as to be normal to the optical axis, and reciprocable between terminal positions into intersection therewith. Each of the blades has one terminal position at which the solid portion overlies and totally blocks the exposure aperture in diaphragm means 13 (closed position), and another terminal position at which the exposure orifice is aligned with the exposure aperture (open position). Between these two terminal positions, each blade has an intermediate position at which it covers only a portion of the exposure aperture. In accordance with convention, it is assumed that the intermediate position at which half of the exposure aperture is covered is the position at which exposure is either initiated or terminated as the case may be.

The blade 19 that causes exposure to be initiated is called the "opening" blade. The initial terminal position at which the opening blade is closed is termed the "blocking" position, while the position intermediate the two terminal positions of the opening blade at which it initiates exposure is termed the "unblocking position." Conversely, the blade 20 that causes exposure to be terminated is called the "closing" blade. The initial terminal position at which the closing blade is open is termed the "unblocking" position, while the position intermediate the two terminal positions of the closing blade at which it terminates exposure is termed the "blocking" position.

Prior to initiation of exposure, the blades are as shown in the solid lines of FIG. 2, inspection of which will indicate that releasable coupling means 22 is engaged with opening blade 19 to hold the latter in blocking position against the bias of spring means 23 which urges the blade toward the unblocking position. Coupling means 22 includes lever 24 pivotally mounted on pin 25 and engaged with latch pin 26 attached to blade 19. Latch spring 27 engaged with lever 24 urges the latter into latching contact with pin 26. Reset bar 28 is rigidly attached to the end of blade 19 opposite exposure orifice 21, and extends normal thereto into the path of movement of closing blade 20. When the opening blade is held in blocking position by coupling means 22, bar 28 is effective to engage blade 20 to maintain the latter open position against the bias of spring means 29 urging the closing blade toward its blocking position. As can be seen from the drawing, bar 28 does not intefere with the independent movement of opening blade 19 to its open position.

Such movement takes place upon manual depression of end portion 30 of lever 24, which rotates the latter about pivot 25 out of engagement with pin 26. Upon disengagement of coupling means 22 from opening blade 19, the latter moves out of blocking position toward open position, and bar 28 is no longer effective to maintain closing blade 20 in its open position. However, initial movement of opening blade 19, in response to the disengagement of coupling means 22 therefrom, is effective to cause shutter control means 18, in a manner to be described later, to retain closing blade 20 in its open position for a preprogramed period of time depending on the level of scene brightness. Since the opening blade moves to unblocking position while the shutter control means releasably retains the closing blade in open position, exposure is initiated. In other words, the shutter operator means is so operably associated with the shutter means, that the latter is caused to initiate exposure in response to actuation of the shutter operator means. At the end of said preprogramed period of time, shutter control means 18 causes closing blade 20 to be released thus terminating exposure when the latter is moved from open to blocking position by the action of bias spring means 29.

When exposure is terminated, blades 19 and 20 are in the position shown by the broken lines of FIG. 2. That is to say, blade 19 is in open position and blade 20 is in blocking position, with reset bar 28 again engaged with blade 20. Having completed the exposure cycle, the blades are returned to their normal positions by reset mechanism 31 which includes reset shaft 32 rotatably mounted on the camera housing, reset lever 33 rigidly fixed to one end of shaft 32 and manual reset actuator 34 rigidly fixed to the other end of the shaft. Spring means 35 biases lever 33 to its normal position out of the path of movement of reset bar 28. However, the manual rotation of lever 33 against spring 35, achieved by the manual rotation of actuator 34 after exposure is terminated, causes lever 33 to engage bar 28 and move both blade 19 and blade 20 back to their normal, pre-exposure positions wherein the opening blade is in blocking position and the closing blade is in open position, the blades being held there by the action of coupling means 22. Upon release of actuator 34, lever 33 returns to its normal position, and the mechanism is ready for the next exposure cycle. If desired, the manual rotation of actuator 34 can be coupled to a film indexing mechanism.

Shutter control means 18 includes shutter operator means 36 actuatable to cause shutter means 17 to initiate exposure, and deactuatable after said preselected period of time to cause the shutter means to terminate exposure, as previously described. Specifically, operator means 36 may take the form of an electromagnet 37 which has solenoid 38, see FIG. 1, wound around one leg of U-shaped pole-piece 39, the free ends of which are coplanar and cooperable with magnetizable keeper 40 mounted on closing blade 20. When the latter is in open position, polepiece 39 and keeper 40 define a magnetic circuit of a particular reluctance, such that a preselected magnetomotive force resulting from the solenoid current is sufficient to establish an attractive force between the pole-piece 39 and the keeper 40 that exceeds the separating force exerted on the closing blade by the biasing action of spring means 29 and is sufficient to resist dynamic loads due to the shock of the bottoming of the opening blade.

Shutter control means 18 further includes shutter timing apparatus 41, the purpose of which is to furnish an energizing current to the solenoid 38 of electromagnet 37. If the camera is to be portable and battery operated, it is important to minimize current drain on the battery. With this in mind, premature release of closing blade 20 is prevented and accurate control of the time that the closing blade is held in unblocking position is obtained by rapidly energizing the solenoid just prior to the release of the opening blade, and effecting a rapid release of the closing blade by the electromagnet at the proper time.

The solenoid 38 should be energized before opening blade 19 begins to move out of unblocking position, because this blade, through bar 28, serves initially to position keeper 40 in engagement with pole-piece 39. Once the keeper separates even slightly from the pole-piece, the reluctance of the magnetic circuit becomes so high, that the attractive force produced by the solenoid current is unable to overcome the force of spring 29 urging the closing blade to blocking position.

Rapid release of the closing blade from the solenoid can be accomplished by rapidly decreasing the current furnished to the solenoid. When the current furnished to the solenoid is rapidly reduced, a voltage is induced thereacross due to the inductance of the solenoid. The induced voltage charges capacitor 42 which shunts the solenoid 38 and prevents the induced voltage from damaging transistor $Q_2$. The current in the solenoid however, rapidly decays to the point where the magnetic induction is so reduced that the force of attraction of the pole-piece on the keeper is equal to the spring force urging separation. At this point, there is an initial movement of keeper 40 as the closing blade is drawn toward unblocking position by the spring bias. The time between the instant that the current in transistor $Q_2$ is rapidly reduced and the instant that release of the closing blade is accomplished is very small in terms of the ordinary exposure interval, being only a fraction of a millisecond. For this reason, it is considered that the conduction of transistor $Q_2$ is reduced, and movement of the closing blade begins at substantially the same time. For the reasons set forth above, namely rapid switching of the current input to the solenoid and low power consumption, shutter timing apparatus 41 comprises a transistorized, two-stage, modified Schmitt-type trigger circuit 43, responsive to the output voltage from network 44, for controlling the actuation and deactuation of shutter operator means 36. The voltage sensitive trigger circuit 43 has a normally nonconducting stage that includes transistor $Q_1$ preferably of a silicon type, having base, collector and emitter electrodes 50b, 50c and 50e respectively. The collector electrode 50c of transistor $Q_1$ is connected to terminal 47 of the shutter timing apparatus by variable bias resistor 52, and emitter electrode 50e of transistor $Q_1$ is connected to terminal 48 of the shutter timing apparatus by variable bias resistor 53. The normally conducting stage of circuit 43 includes transistor $Q_2$ having base, collector and emitter electrodes 54b, 54c and 54e. Collector electrode 54c is connected to terminal 47 through solenoid 38 so that the latter is energized when $Q_2$ conducts. Base electrode 54b of transistor $Q_2$ is connected to collector electrode 50c of transistor $Q_1$ through lead 55, and emitter electrode 54e of $Q_2$ is connected through bias resistor 53 to terminal 48. It should be noted that with this arrangement there is essentially a common emitter resistor, the adjustment to resistor 53 being for the purpose of establishing the voltage at which it is desired to trigger circuit 43. While the two stages of circuit 43 have been characterized as "normally nonconducting" and "normally conducting" it should be obvious that this characterization is applicable only when a potential source is applied across terminals 58 and 59.

In order to apply potential source 56, shown in the form of a battery of potential $E_0$ connected from terminal 58 to terminal 59 through normally open switch S1, in such a way as to minimize current drain on the battery, actuator lever 24 (see FIG. 2) is provided with switch operating arm 57 that is engageable with one of the contacts of switch S1. When the lever is manually depressed to disengage coupling means 22 from opening blade 19, the contacts of switch S1 are closed.

The sequence of events that occur as a result of the depression of end portion 30 will now be explained by making reference to the expanded time-scale diagram shown in FIG. 3. The initial depression of portion 30 closes the contacts of S1 before the rotation imparted to lever 24 effects its disengagement from pin 26. Since human reaction time involved in depressing lever 24, namely the time to depress the lever and release it, and the inertial delay of the lever in returning to its normal position, substantially exceeds the longest average exposure apt to be used under normal conditions of scene brightness, the contacts of switch S1 are closed for at least as long as the correct exposure time.

Inspection of transistor $Q_2$ stage of circuit 43 indicates that base electrode 54b, as shown in FIG. 2, is the input to this stage, collector electrode 54c is the output, and emitter electrode 54e is common to the input and output. Resistor 52 coupled between input electrode 54b and terminal 58 acts as a fixed base resistor for providing, when $S^1$ is closed, a fixed base current bias that causes transistor $Q_2$ to conduct instantaneously with the closing of S1. The setting of variable resistor 52 establishes the degree to which transistor $Q_2$ conducts so that the current through solenoid 38 can be adjusted to provide the proper magnetomotive force in the magnetic circuit of electromagnet 37 for preventing accidental release of closing blade 20 when the opening blade moves to unblocking position to initiate exposure. The flow of current through resistors 52 and 53, when transistor $Q_2$ conducts, establishes at the collector and emitter electrodes of $Q_1$, bias voltages having first values dependent upon the magnitudes of the respective currents and resistance values.

Until the initial displacement of the opening blade out of its blocking position, conductive block 74 on the opening blade engages the contacts of S2 whereby the latter is closed. Connection 49 is at an initial value of voltage, namely ground potential, and the instant S1 is closed. When the voltage at connection 61 is at its initial value, and the voltages at the collector and emitter electrodes of transistor $Q_1$ are at their first values of bias voltage due to the conduction of $Q_2$, the collector-base and emitter-base junctions of transistor $Q_1$ are reverse biased, thus resulting in transistor $Q_1$ being cut off. For this reason, it may be said that the bias of transistor $Q_1$ is primarily established by the voltage at terminal 61.

Meanwhile, the current through the solenoid builds rapidly to its maximum value causing the maximum retaining force to be exerted on the closing blade shortly after S1 is closed and just prior to the total disengagement of lever 24 from pin 26 which releases the opening blade for movement out of blocking position. The initial movement of the opening blade causes conductive block 74 to disengage the contacts S2 thereby opening the same to apply the voltage source across timing network 44 and activate the same. Network 44 includes capacitor means C in series with a smaller network 5 of four individual photoconductive elements 46, 47, 48 and 49 such as cadmium sulfide photocells or the like and connected together in a manner which will be described in detail later in the specification. Network 44 is connected between terminals 58, 48 of the shutter timing apparatus so as to form a conventional integrator circuit whose input terminal is at 58, and whose output terminal is at 61, the connection between the capacitor means and the photoconductive element. Terminal 61 is connected by fixed impedance 60 to base electrode 50b of transistor $Q_1$, the latter electrode constituting the input electrode of that stage.

The opening of S2 activates network 44, which is to say that the latter is caused to generate, at connection 61, a voltage having an initial value (in this case ground potential) which causes transistor $Q_1$ to be reverse biased to cut-off, and then changes with time reaching a preselected value, termed the trigger voltage, which forward biases transistor $Q_1$, in a period of time termed the trigger generation time.

When the voltage at connection 61 reaches the trigger voltage, it causes the emitter-base junction of transistor $Q_1$ to be forward biased. Now, network 5 functions like a base resistor whose value is dependent upon the level of scene brightness and provides base current bias that cause transistor $Q_1$ to conduct producing collector current at the output electrode thereof which flows through resistor 52 increasing the voltage drop thereacross and lowering the voltage at the input electrode of $Q_2$. This reduces the forward bias on $Q_2$ thus decreasing the flow of current through the latter and causing a reduction in the voltage drop across bias resistor 53 thereby increasing the forward bias on transistor $Q_1$ even more. This regenerative feedback between the stages of voltage sensitive trigger circuit 43 will cause conduction to switch rapidly from transistor $Q_2$ to transistor $Q_1$, if sufficient collector current is available in transistor $Q_1$. Assuming this is true, the different flows of current through bias resistors 52 and 53 after switching takes place, establish second values of bias voltages at electrodes $50c$ and $50e$ of transistor $Q_1$ such that the conduction of transistor $Q_2$ is severely and rapidly reduced thereby rapidly deenergizing solenoid 38 to effect a sharp release of the closing blade. When the closing blade is released, it begins to move out of unblocking position, and will terminate exposure at its blocking position as explained previously. Thus, the shutter means terminates exposure in response to deactuation of the shutter operator means.

As described above network 44 includes capacitor means C in series with a smaller network of four individual photosensitive elements 46, 47, 48 and 49 such as cadmium sulfide photocells or the like the cells being arranged to receive light from four substantially separate portions of the scene to be photographed as illustrated in FIGURE 1. The camera lens 62 is shown schematically as receiving light from the entire scene 63. The photocells may be arranged in a rectangle with conductive means 75 and 76 providing series connections between the pairs of diagonally located photocells and conductive means 77 and 78 providing parallel connections between both diagonal pairs. Element 80 is schematically shown as directing the light from the various portions of the scene being photographed to the individual photocells. As the photocells have a resistance inv ersely related to the level of scene brightness the cells exposed to the brightest segment of the scene will have a lower resistance and would tend to shorten the exposure interval in the circuit disclosed in FIG. 2. However, if the diagonally positioned photocell with which it is connected in series is receiving less light from the diagonally opposite portion, as for example in the case of a dark foreground, it will have a higher resistance and the two resistances connected in series will automatically provide a reading in which both the light and dark areas of the scene are effective to control exposure. But this invention goes even further in providing another pair of oppositely oriented diagonal photocells which are similarly connected in series so that they may each read the brightness of the diagonally opposite portions of the scene as shown in FIGURE 1 and provide a similarly balanced reading. The diagonal pairs are then connected in parallel so that their combined effect will be available to the circuit to give optimum exposure control. For example, in a scene in which only one of the four portions are brightly lighted only one pair of diagonal cells will be effected by the brighter area while the other diagonal pair will receive light only from the darker areas so that the system will tend to reduce the effect of this small bright area on exposure and provide an exposure factor relevant to the predominant darker areas. Thus, even in difficult picture taking situations such as a back lighted scene with a bright sky and dark foreground a more balanced exposure than heretofore possible is achieved in a completely automaitc manner.

Since certain changes may be made in the above device without departing from the scope of the invention herein involved, it is intended that all matter contained in the above description or shown in the accompanying drawing shall be interpreted as illustrative and not in the limiting sense.

What is claimed is:
1. A photographic exposure control system comprising:
light-sensitive means including at least four photosensitive elements constructed and arranged to receive light from four respective rectangularly arrayed portions of a scene to be photographed, each of said elements having an electrical parameter which varies in accordance with the quantity of light incident thereon from its respectively associated portion of the scene;
first conductive means interconnecting said elements in series-connected pairs receiving light from diagonally opposite portions of said scene;
second conductive means connecting said series connected pairs in parallel with each other to form a series-parallel network of said photosensitive elements;
exposure control means for varying the amount of light admitted through a photographic aperture during an image-forming exposure; and
an electrical control circuit responsive to the combined parameters of said series-parallel network of photosensitive elements for regulating said exposure control means.

2. A camera having a protected light path between a lens and a film plane and exposure control means for photographing a scene that can have different levels of brightness in various portions of the picture area such that the correct exposure is functionally related to the various levels of portion brightness, comprising:
means responsive to the light from a plurality of substantially separate portions of the scene, said means comprising electric circuit means including a source of potential and a plurality of individual photoconductors arranged to receive light from said separate portions;
means for connecting at least two pairs of said photoconductors in series in said electric circuit and means connecting at least one of said series connected pairs of photoconductors in parallel with at least another pair of series connected photoconductors; and
means responsive to the electric current flow through the combination of photoconductors for regulating the exposure control means to provide the proper exposure factor for the scene to be photographed.

3. A camera having a protected light path between a lens and a film plane and exposure control means for photographing a scene that can have different levels of brightness in various portions of a rectangular picture area such that the correct exposure is functionally related to the various levels of portion brightness, comprising:
means responsive to the light from four substantially separate portions of the scene, said means comprising electric circuit means including a source of potential and four individual photoconductors arranged to receive light from said four separate portions respectively, with series connections between the pairs of photoconductors receiving light from the diagonally located portions of the rectangular picture area and parallel connections between both diagonal pairs; and
means responsive to the electrical current flow through the combination of photoconductors for regulating the exposure control means to provide the proper exposure factor for the scene to be photographed.

4. The invention of claim 3 wherein the exposure control means comprises: shutter means for controlling the time interval that the light from the scene is allowed to pass through the lens to the film plane of the camera.

5. The invention of claim 3 wherein the exposure control means comprises:
shutter means for controlling the time interval that the light from the scene to be photographed is allowed to pass through the lens to the film plane of the camera; and shutter operator means constructed and arranged so that the shutter means is caused to initiate exposure in response to actuation of said shutter operator means and caused to terminate exposure only when said shutter operator means is deactuated for at least a given period of time.

6. The invention of claim 3 wherein the exposure control means include:

shutter means for controlling the time interval that the light from the scene is allowed to pass to the film plane of the camera;

diaphragm means for effecting the size of the aperture through which the light from the scene is allowed to pass to the film plane; and means for regulating at least one of said shutter or diaphragm means to provide the proper exposure factor for the scene to be photographed.

7. The invention of claim 3 wherein the means responsive to the electric current flow through the combination of photoconductors includes:

a shutter means for controlling exposure;

shutter operator means constructed and arranged so that said shutter means is caused to initiate exposure in response to actuation of said shutter operator means and caused to terminate exposure only when said shutter operator means is deactuated for at least a given period of time;

a voltage sensitive trigger circuit, including a transistor stage having an input, for actuating and deactuating said shutter operator means;

means for causing said voltage sensitive trigger circuit to actuate said shutter operator means;

an electric network including capacitor means coupled to said plurality of photoconductors which are exposed to light from a scene to be photographed, said photoconductors having a resistance inversely related to the level of scene brightness;

means coupling the capacitor means of said network to said input;

said network being so constructed and arranged that when activated, the charge on said capacitor means begins to change causing the voltage at said input to change from an initial value, which reverse biases said stage to cut-off, to a preselected value termed the trigger voltage, which forward biases said stage into conduction, in a period of time termed the trigger generation time; and means to activate said network substantially at the same time said voltage sensitive trigger circuit actuates said shutter operator means.

References Cited

UNITED STATES PATENTS 2,183,217 12/1939 Goldsmith.
2,378,433 6/1945 Rizsdorfer.
3,232,192 1/1966 Stimson.

JOHN M. HORAN, Primary Examiner

U.S. Cl. X.R.

355—38, 83